United States Patent [19]

De Vries et al.

[11] Patent Number: 5,177,164
[45] Date of Patent: Jan. 5, 1993

[54] PROCESS FOR SHORTSTOPPING AN EMULSION POLYMERIZATION

[75] Inventors: Sijtske M. De Vries; Johannes A. M. Willemsen, both of Vondelingenweg, Netherlands

[73] Assignee: Shell Oil Company, Houston, Tex.

[21] Appl. No.: 723,318

[22] Filed: Jun. 28, 1991

[51] Int. Cl.$^5$ .............................................. C08F 2/38
[52] U.S. Cl. ....................................... 526/82; 526/85; 526/123; 526/335; 526/340; 526/230
[58] Field of Search .................. 526/85, 82, 230, 123, 526/335, 340

[56] References Cited

U.S. PATENT DOCUMENTS

| | | | |
|---|---|---|---|
| 2,469,017 | 5/1949 | Sundet | 260/84.3 |
| 2,574,020 | 11/1951 | Crouch | 526/85 |
| 2,602,078 | 7/1952 | Schulze et al. | 260/84.3 |
| 2,616,875 | 11/1952 | Adams et al. | 260/84.3 |
| 2,662,876 | 12/1953 | Antlfinger | 260/82.7 |
| 3,322,736 | 5/1967 | Nudenberg et al. | 260/82.7 |
| 3,855,188 | 12/1974 | Uraneck et al. | 526/221 |
| 4,242,477 | 12/1980 | Koski et al. | 526/84 |

FOREIGN PATENT DOCUMENTS

| | | |
|---|---|---|
| 57212243 | 6/1981 | Japan . |
| 58002337 | 6/1981 | Japan . |
| 58005349 | 7/1981 | Japan . |
| 58005350 | 7/1981 | Japan . |
| 971850 | 12/1980 | U.S.S.R. . |

OTHER PUBLICATIONS

Industrial and Engineering Chem., vol. 45, No. 1, Jan. 1953, pp. 182-186.
D. C. Blackley, Emulsion Polymerization, Theory and Practice, 1975, pp. 406-417 and 430-435.

*Primary Examiner*—Joseph L. Schofer
*Assistant Examiner*—Tom Weber

[57] ABSTRACT

A process for shortstopping a free radical polymerization of a conjugated diene and optionally a vinyl-substituted aromatic in an aqueous emulsion, using a hydroperoxide as initiator and a redox activator, comprising a divalent transition metal, a reducing agent and optionally being carried out in the presence of a modifier, and being performed by using as sole shortstopping agent an alkali metal polysulphide. This process results in the production of polymeric products which are free of carcinogenic nitrosamines.

23 Claims, No Drawings

PROCESS FOR SHORTSTOPPING AN EMULSION POLYMERIZATION

BACKGROUND OF THE INVENTION

This invention relates generally to the shortstopping (termination) of the polymerization of a conjugated diene optionally mixed with a vinyl-substituted aromatic in an aqueous emulsion, free radical polymerization process conducted at from −20° to 70° C., using a redox initiator. More particularly, this invention relates to the termination of the aqueous free radical emulsion polymerization of butadiene, optionally mixed with styrene (e.g. ESBR).

The field of aqueous emulsion free radical polymerization constitutes a well established art. The systems now used were generally established in the 1940's and the 1950's.

In emulsion polymerization processes, the monomer is emulsified in a medium such as water with the aid of emulsifying agents such as soaps and synthetic emulsifiers. Initially the monomer is present in the form of emulsion droplets dispersed in the continuous aqueous phase. According to the present invention the emulsion droplets play only a minor role and the polymerization in emulsion systems occurs primarily in the aqueous phase and not in monomer droplets.

Considerable work published in the last decades has shown that the process of emulsion polymerization is more complicated and more subtle than previously believed and several theories have been developed in order to explain the experimental data, such as particle size, the conversion-time relationship, the dependence of particle size and molecular weight on conversion, and the influence of surfactant, initiator and monomer.

The chain reaction in free radical emulsion polymerization is initiated by radicals that are generated either by decomposition of peroxides or diazo compounds or by an oxidation-reduction reaction (a redox couple).

Early free radical emulsion polymerizations which were carried out at 50° C. or higher (hot polymerization), reflected the temperature dependency of the formation rate of free radicals and therefore, of polymerizations.

A subsequent research led to the discovery of oxidation-reduction reactions capable of generating radicals in sufficient numbers for adequate polymerization rates at temperatures as low as −40° C. (cold polymerization).

Commonly employed dissociative initiators are potassium peroxydisulphate ($K_2S_2O_8$), benzoyl peroxide and azobisisobutyronitrile (AIBN), whereas cumene hydroperoxide and p-menthane hydroperoxide are oxidants for redox couples.

The combination of potassium peroxydisulphate with a mercaptan, such as dodecyl mercaptan, is used to polymerize e.g. butadiene and styrene. In hot recipes the mercaptan furnishes free radicals by its reaction with the peroxydisulphate, and it limits the molecular weight of the polymer by reacting with and terminating the growing polymer chain; the resulting thiyl radical initiates the growth of another chain. This use of mercaptan as a chain transfer agent or modifier is of great commercial importance in the manufacture of emulsion SBR and polybutadiene, since the mercaptan allows control of the toughness of the product, which otherwise may limit further processing.

The conversion rate to polymer at 50° C. is 5-6%/hr. Polymerization is terminated at 70-75% conversion or less since higher conversions lead to polymers with inferior physical properties, presumably because of cross-linking in the latex particle to form microgel or highly branched structure.

A further improvement in SBR production could be attained by the use of more active radical initiating systems that permitted polymerization at 5° C. with high rates of conversion. These cold SBR polymers produced at lower temperature, but stopped at 60% conversion were found to have superior properties as to those of hot SBR.

At 5° C. a 60% conversion to polymer occurs in about 8-12 hours. In the persulphate hot recipe the mercaptan initiates and functions as a chain transfer agent, but in the cold redox recipes, the mercaptan is not essential to initiation. The main difference lies in the initiator systems.

The usually applied phosphates and ethylenediaminetetra acetic acid (EDTA) act as buffers and complex with ferrous ions, thereby maintaining a constant solubility and limiting its reactivity. This reaction is very rapid at 0° C.; the emulsion components are in separate phase and the reaction occurs only at the interface. In many cold recipes auxiliary reducing agents, such as sulphoxylates are used as components of a redox cycle, i.e. the ferric ion is reduced to the ferrous state. Reducing sugars are no longer in widespread use because of their cost and susceptibility to bacterial attack during storage.

Although this initiator system is primarily used for so-called cold polymerizations, it will be appreciated that such system can also be used for higher temperature polymerizations.

For property control reasons, it is a well established practice, that the termination of the polymerization is effected by the addition of a shortstop, which reacts rapidly with radicals and oxidizing agents, thus destroying any remaining initiator and polymer free radicals and preventing the formation of new radicals.

The unreacted monomers are then removed: first the conjugated diene and more particularly butadiene by flash distillation at atmospheric then at reduced pressure; second the styrene usually by steam stripping in a column.

A dispersion of antioxidant is added to protect the product. The latex is optionally mixed with oil, and coagulated by the addition of dilute acid e.g. sulphuric acid and optionally a salt, e.g. aluminium sulphate or sodium chloride.

In particular, shortstopping compositions should meet the requirements as disclosed in e.g. D. C. Blackley "Emulsion Polymerization", Theory and Practice 1975, p. 406.

Such chemicals included for example mixtures of a water soluble sulphide, such as hydrogen sulphide, ammonium sulphide, or sulphides or hydrosulphides of alkali or alkaline earth metals and an organic compound possessing a quinonoid structure, such as quinone or an organic compound which may be oxidized to a quinonoid structure, such as hydroquinone; N-substituted dithiocarbamates; reaction products of alkylene polyamines with sulphur, containing presumably sulphides, disulphides, polysulphides and/or mixtures of these and other compounds; dialkylhydroxylamines, N,N'-dialkyl-N,N'-methylenebishydroxylamines, dinitrochlorobenzene, dihydroxydiphenyl sulphide and dinitrophenylbenzothiazyl sulphide. It will be appreciated that the efficiency of the selected shortstopping agent will be dependent on inter alia the type of the initiator to be used.

U.S. Pat. No. 2,469,017, herein incorporated by reference, discloses a process for the polymerization of butadiene-1,3 in aqueous emulsion in the presence of a peroxygen compound, comprising supplying to the emulsion, at a monomer conversion degree of 20 to 80%, an organic compound possessing the quinone structure and a water soluble inorganic sulphide of the class consisting of hydrogen sulphide, ammonium sulphide and alkalimetal sulphides and hydrosulphides, the said compound of quinonoid structure being supplied to the emulsion at least as soon as the said sulphide and in an amount from 0.001 to 0.05% by weight based on the amount of monomeric material originally present in the emulsion before polymerization and the said sulphide being supplied to the emulsion in an amount from 0.01 to 0.2% by weight based on the amount of monomeric material originally present in the emulsion whereby further polymerization of monomers is immediately terminated.

As suitable peroxygen compound were indicated hydrogen peroxide, an alkali metal or ammonium persulphate or perborate, and more particularly potassium persulphate, whereas as shortstopping co-component hydroquinone is preferably used. Especially from column 3, lines 19-21, it may be derived that when the sulphide is used without hydroquinone the polymerization proceeds to significantly higher conversion.

U.S. Pat. No. 2,602,078, herein incorporated by reference, discloses the use of N-substituted dithiocarbamates as effective shortstopping agents for emulsion polymerization reactions, resulting in the production of polymers with substantially improved properties which are substantially snow white.

Especially from column 1, lines 20-33 in relation to column 4, lines 62-68 of said patent, it may be derived that the employment of e.g. sodium sulphide and hydroquinone in emulsion polymerization should lead to difficulties and was not attractive.

More particularly from example II of U.S. Pat. No. 2,616,875, it is known that sodium thiosulphate and sodium sulphide respectively can not be regarded as active ingredients of the shortstopping agents obtained by reaction of alkylene polyamines with sulphur.

Moreover it was known from U.S. Pat. No. 2,662,876, that the polymerization in aqueous emulsion of a butadiene-1,3 optionally mixed with other copolymerizable monomeric materials, could be efficiently terminated by the addition to the emulsion at any desired stage of polymerization, of a combination of substances consisting of:

(1) a solution of an agent selected from the class consisting of sulphur, alkylthiuram polysulphides, alkyl xanthogen polysulphides and water-soluble inorganic polysulphides, and (2) an aqueous solution of a water-soluble salt of dithiocarbamic acid, wherein substance (1) being added in amounts equivalent to from 0.01 to 0.10% by weight of sulphur and substance (2) being added in amounts of from 0.01 to 0.10% by weight, based on the weight of monomer initially present in said emulsion. Both U.S. Pat. Nos. 2,616,875 and 2,662,876 are herein incorporated by reference.

As a preferred inorganic, water-soluble polysulphide, sodium polysulphide was proposed. However, especially from example 3 of U.S. Pat. No. 2,662,876 it is learnt that sodium sulphide alone as shortstopping agent was significantly less active as compared with the sulphur-carbamate stopping agent.

A shortstopping agent for an aqueous emulsion polymerization of butadiene-1,3 hydrocarbons and mixtures of butadiene-1,3 hydrocarbons and compounds, which contain a $CH_2=CH$ group and are copolymerizable with butadiene-1,3 hydrocarbons, e.g. styrene, comprising a combination of alkali metal-hydrosulphite, -hydroxide and -nitrite, wherein the amount of added alkali metal hydrosulphite being from 0.1 to 1 part by weight per 100 parts by weight of polymerizable monomeric material originally present, the added alkali metal hydroxide being from 0.5 to 3 mols per mol of added alkali metal hydrosulphite and the added alkali metal nitrate being from 0.1 to 2 mols per mol of added alkali metal hydrosulphite, was known from e.g. U.S. Pat. No. 3,322,736.

U.S. Pat. No. 4,242,477, herein incorporated by reference, discloses an improved process for shortstopping the polymerization of butadiene and styrene in an emulsion, free radical polymerization process conducted at a temperature of from about 40° C. to about 60° C., using potassium or ammonium persulphate as polymerization initiator, comprising the use of ascorbic acid or the sodium or potassium salts thereof, in a quantity of ascorbic acid or salts thereof of from about 0.1 to about 0.75 parts by weight per 100 parts by weight of butadiene plus styrene charged in the polymerization system. Polymer produced does not discolour, does not have odour and appears not to contain chemicals detrimental to the use of the polymer in food- or drug-related applications. However, these shortstopping agents were indicated not to be used as shortstops in the cold redox or hot redox polymerization systems.

A preferred, more optimized, shortstopping agent for a redox initiation system which has been widely used on an industrial scale for many years, comprises a combination of dithiocarbamate and sodium polysulphide optionally mixed with sodium nitrite, the latter ingredient of which was regarded as useful for the prevention of undesired, uncontrolled polymerization of the non-converted monomers during the recovery of these monomers from the shortstopped polymerization reaction mixture.

This so-called wild polymerization will give rise to an increase in molecular weight of the final polymer and production of undesirable cross-linked polymer (popcorn polymer), which may lead to fouling of butadiene distillation and flashing equipment and even to bursting of pipes, as is disclosed in D. C. Blackley, "Emulsion Polymerization", Theory and Practice, 1975, p. 430-435.

However, a disadvantage of such combinations is that dithiocarbamates and nitrites are precursors for the formation of nitrosamines which are suspected to be carcinogenic.

It will be appreciated by a person skilled in the art, that according to the the prior art, sulphides were only used, if any at all, as one of the ingredients of shortstopping agents and certainly not as sole shortstopping agent. This teaching is also disclosed in D. C. Blackley, "Emulsion Polymerization", Theory and Practice, 1975, p. 406-417, and particularly p. 416, and from the publications referred to therein.

On the other hand efforts in present research and development in the rubber industry has greatly increased to prevent the formation of N-nitroso compounds from possible precursors in shortstopping agents during emulsion SBR manufacture. Guidance on this is provided in for example by Japanese patent applications Nos. 58,005,349; 58,005,350; 58,002,337 and 57,212,243 and Russian patent No. 971,850 which are herein incorporated by reference.

SUMMARY OF THE INVENTION

It is therefore an object of the present invention to provide an effective shortstopping agent, substantially free of co-ingredients which might be regarded as precursors for the formation of N-nitrosamines, and which still meets the hereinbefore specified requirements as much as possible when emulsion polymerization reaction mixtures derived from a conjugated diene, optionally mixed with a vinyl-substituted aromatic, the polymerization of which was initiated by redox systems.

It is another object of the present invention is to provide an economically attractive, more simple process, wherein the inventive shortstopping agent can be successfully applied.

As a result of extensive research and experimentation, a process has been discovered for the manufacture of polymers derived from a conjugated diene, optionally mixed with a vinyl-substituted aromatic, by means of aqueous emulsion polymerization and more particularly ESBR, using an effective shortstopping agent.

Accordingly the present invention relates to a process for shortstopping a free radical polymerization of a conjugated diene, and preferably butadiene-1,3, and optionally a vinyl-substituted aromatic, and preferably styrene, in an aqueous emulsion polymerization process conducted at a temperature of from $-20°$ C. to $70°$ C., using a hydroperoxide as initiator and a redox activator system, comprising a divalent transition metal, and preferably ferro, a reducing agent and optionally a chelating agent, and the polymerization process optionally being carried out in the presence of a modifying agent, characterized in that as sole shortstopping agent an alkali metal polysulphide is used in an amount of at least 0.01 and preferably in the range of from 0.02 to 0.5 parts by weight per hundred parts by weight of the total monomers, initially charged to the polymerization system.

DETAILED DESCRIPTION OF THE INVENTION

The term "alkali metal polysulphide" as used throughout the present specification refers to compounds of the general formula $Me_2S_x$, wherein x has a value in the range of from 1.5 to 6.0 and preferably in the range of from 2.5 to 4.5 and most preferably a value of about 4 and wherein Me represents an alkali metal. Suitable alkali metal polysulphides include the sodium or potassium salt, of which the sodium salts are preferred.

As suitable reducing agents may be used e.g. sodium formaldehyde sulphoxylate, sodium sulphite, sodium benzaldehyde sulphoxylate or a reducing sugar, of which sodium formaldehyde sulphoxylate is preferred. As a chelating agent may be used e.g. sodium ethylenediamine tetraacetate (EDTA), sodium silicate, sodium pyrophosphate or polyphosphate, of which EDTA is preferred.

The shortstopping agent may be applied according to the present invention for the manufacture of (homo)-polymers of conjugated diene and more particularly butadiene-1,3, isoprene, chloroprene, piperylene, 2,3-dimethyl-1,3-butadiene and the like or mixtures thereof, of which butadiene-1,3 pure or mixed with minor amounts of other conjugated dienes is preferred. It may also be used to produce copolymers of such a conjugated diene and a vinyl-substituted aromatic, such as styrene, alpha-methyl styrene, vinyl naphthalene, 2,4-dichlorostyrene, p-methoxystyrene, p-methylstyrene, 3,4-dimethylstyrene, divinyl benzene, a-propyl styrene, o-hydroxystyrene, a-undecylstyrene, o-methyl-a-methyl styrene and the like or mixtures thereof, of which styrene, pure or optionally mixed with minor amounts of one or more other vinyl-substituted aromatic monomers, is the preferred monomer.

According to the process of the present invention there may be prepared homopolymers or copolymers with wide variations in monomer ratios. The ratio by weight of the conjugated diene, e.g. butadiene, and the vinyl-substituted aromatic e.g. styrene, if any, may preferably vary in the range of from 80:20 to 50:50.

The aqueous emulsion polymerization process according to the present invention can be carried out at a temperature of from $-20°$ C. to $70°$ C., and more particularly as a so-called "cold polymerization", using temperatures in the range of from $-20°$ C. to $10°$ C., and as so-called "hot polymerization", using temperatures in the range of from $40°$ C. to $70°$ C.

As suitable initiator to be applied for the process of the present invention may be used: paramenthane hydroperoxide, cumene hydroperoxide, pinane hydroperoxide, diisopropyl toluene hydroperoxide, diisopropylbenzene hydroperoxide, p-tert.butyl cumene hydroperoxide, hydrogen peroxide, 1,1-diphenylethane hydroperoxide and the like, or mixtures thereof, of which paramenthane hydroperoxide is preferred. Said initiators are normally used in an amount of from 0.01-0.4 parts by weight per 100 parts by weight of initially charged monomers.

The hydroperoxides are combined with a ferrocompound/sulphoxylate/chelating agent combination as redox activator to be applied. A suitable example of such activator component generally comprises a ferro compound, preferably ferrosulphate, in combination with a sulphoxylate component and more preferably sodium formaldehyde sulphoxylate, and EDTA.

The activators generally comprise of: ferrosulphate 0.001-0.04 parts by weight; sulphoxylate 0.01-0.2 parts by weight; and chelating agent 0.005-0.2 parts by weight per 100 parts by weight of initially charged monomers.

More preferably a combination of ferrosulphate, sodium formaldehyde sulphoxylate and EDTA in the indicated ranges is useful as an activator of the polymerization to be shortstopped.

As suitable modifier during the (co)polymerization can be used e.g. xanthogendisulphides, thioethers, thiophosphates and alkyl mercaptans containing 9 to 16 carbon atoms in the alkyl and more preferably tert-.dodecyl mercaptan. Other suitable modifiers may be selected from n-dodecyl mercaptan, t-hexadecyl mercaptan.

The modifier is normally used in an amount of from 0.05-0.6 parts by weight per 100 parts by weight of initially charged monomers.

When operating according to the process of the present invention, temperatures may range from $-20°$ C. to about $70°$ C. with temperatures from $0°$ C. to $50°$ C. being usually preferred.

When polymerizations are carried out in aqueous emulsion in the absence of freezing point depressants, temperatures below the freezing point of water cannot be employed.

It is generally preferred that the emulsion be of an "oil in water" type, with the ratio of aqueous medium to monomeric material in the range of from 0.5:1 to 5:1 and preferably from 1.5:1 to 2.75:1, in parts by weight.

At low ratios the emulsions tend to have high viscosities and at high ratios the yield per unit volume of reactor per unit of time is low. In the practice of the present invention suitable devices will be necessary to establish and maintain an emulsion and to remove reaction heat to maintain a desired reaction temperature. Such devices are commercially available and are known to those of skill in the art.

The emulsifier used is generally a fatty acid and/or rosin acid soap, di-tert.butyl benzoic acid or a derivative of Versatic acid (trade mark) and the polymerization recipe may contain a small amount of one or more electrolytes, such as trisodium phosphate or potassium chloride.

Generally also a small amount of surfactant may be added, such as e.g. sodium salt of naphthalene sulphonic acids polymers. Moreover, if necessary, a base may be added to adjust the required alkaline environment such as sodium hydroxide or potassium hydroxide. A preferred pH value is in the range of from 9-13 and most preferably in the range of from 10 to 11.

The polymerization may be conducted in batches, semi-continuously or continuously. The total pressure on the reactants is preferably at least as great as the total vapour pressure of the mixture, so that the initial reactants will be present in the liquid phase.

After reaching the desired conversion of monomers to polymers which is normally in the range of from 55 to 90%, the polymerization is stopped by addition of the shortstopping agent.

In order to effectively prevent further formation of polymer during the removal of unreacted monomers, the shortstopping agent used according to the present invention is used in an amount of at least 0.07 parts by weight per hundred parts by weight of the total monomers, initially charged to the polymerization system, and preferably in an amount of from 0.02 to 0.5 and more preferably of from 0.04 to 0.06.

The latex is passed to one or more, and generally two, tanks in which the pressure is finally reduced to about 20 cm of mercury and in which a major proportion of the unreacted conjugated diene (e.g. butadiene) is vapourized and removed as an overhead vapour stream. In the beforementioned tanks an agent to prevent the formation of popcorn may optionally be introduced. Preferably a colloidal sulphur suspension is used for this purpose.

According to one embodiment of the manufacturing processes, the latex is then passed to a stripping column in which any remaining butadiene and the unreacted styrene is removed. From such a stripping column, the latex is passed to either chemical and/or mechanical coagulation and recovery facilities for the final recovery of dry polymer or to concentrating facilities for production of latex having from about 45 to about 65 per cent polymer solids. According to another embodiment, the latex from which butadiene has substantially been removed by stripping, is chemically and/or mechanically coagulated and the coagulated rubber is dried in a mechanical dryer, whereby the free vinyl-substituted aromatic (styrene) monomer is recovered during the drying operation.

It will be appreciated that the efficient results achieved by the shortstopping agent used according to the process of the present invention, certainly could not be predicted or even expected by a person skilled in the art, having in mind the hereinbefore discussed state of the prior art.

The process of the present invention provides rubbers, in which during manufacturing and subsequent compounding and additional processing steps the formation of carcinogenic nitrosamines from compounds, occurring in the rubbers is avoided.

Moreover, the rubbers thus produced also show a more reproducible quality due to the fact that a reduced amount of chemicals is used as compared with the conventional shortstopping compositions, containing several ingredients, and due to the absence of compounds, such as sodium dimethyldithiocarbamate, which may lead to incorporation of varying amounts of vulcanization accelerators in the rubber product, the amounts varying with actual manufacturing conditions.

It will be appreciated that these features are additional advantages of the process of the present invention.

The following examples further illustrate the various aspects of the present invention.

EXAMPLE 1

Styrene and butadiene are polymerized into polymer having a 23/77 ratio, in a 10 liter reactor in an aqueous emulsion prepared by means of a 50/50 mixture of fatty acid/rosin acid soap (concentration 4% by weight on monomers).

As initiator system ferrosulphate/sodium formaldehyde sulphoxylate/paramenthane hydroperoxide is used in amounts of: ferrosulphate 0.007 phm; sodium formaldehyde sulphoxylate (SFS) 0.04 phm; paramenthanehydroperoxide (PMHP) 0.03 phm; calculated relative to the 100 parts by weight of initially charged monomers.

As modifier is used tert.dodecyl mercaptan (0.11 phm) and the polymerization is carried out at 5° C. until 60% conversion.

Then 0.05 parts by weight of sodium polysulphide $Na_2S_x$ wherein x has a value of about 4, per 100 parts by weight of monomers are added to a part of said polymerization mixture, (A), whereas to another part of said mixture a conventional shortstopping agent is added, comprising:

0.015 phm sodium polysulphide
0.04 phm sodium nitrite
0.10 phm sodium dimethyldithiocarbamate (SDD) (B).

The polymerization mixture still containing the non-converted monomers, is subsequently heated to 50° C.

For both recipes no increase in Mooney viscosity (MV) of the rubber or increase in solid content (i.e. conversion) is observed, as may be derived from the following Table 1:

TABLE 1

| recipe shortstop | | hrs after addition of shortstop | | | | |
|---|---|---|---|---|---|---|
| | | 0 | 3 | 6 | 9 | 12 |
| A 0.10 phm SSD 0.015 phm $Na_2S_4$ | MV | 118 | 122 | 124 | 127 | 124 |
| | % solids | 23.7 | 23.4 | 23.4 | 23.6 | 23.1 |

TABLE 1-continued

| | hrs after addition of shortstop | | | | | |
|---|---|---|---|---|---|---|
| recipe shortstop | | 0 | 3 | 6 | 9 | 12 |
| 0.04 phm NaNO₂ | MV | 121 | 125 | 125 | 128 | 122 |
| B 0.05 phm Na₂S₄ | % solids | 23.9 | 23.6 | 23.5 | 23.6 | 23.7 |

The respective nitrosamine content of rubber produced appear to be
A: 500 lg dimethylnitrosamine (DMNA)/kg copolymer
B: <10 lg DMNA/kg copolymer.

EXAMPLE 2

A styrene/butadiene mixture is polymerized in a continuous process in a series of reactors into a polymer containing 23% by weight of styrene and 77% by weight of butadiene, at 5° C. until a conversion degree of 60% is reached, using as initiator system and as emulsifier those ones specified in Example 1.

After addition of shortstop the latex (still containing non-converted monomers) is kept at ambient temperature (25° C.) for several days, and the Mooney viscosity and solids content are measured as summarized in Table 2:

TABLE 2

| | hrs after addition of shortstop | | |
|---|---|---|---|
| recipe | | 0 | 2 |
| A 0.10 phm SSD 0.015 phm Na₂S₄ 0.04 phm NaNO₂ | MV | 124 | 122 |
| | % solids | 25.6 | 26.3 |
| B 0.015 phm Na₂S₄ | MV | 124 | 120 |
| | % solids | 25.6 | 26.5 |
| C 0.15 phm DSEC* | MV | 124 | 143 |
| | % solids | 25.6 | 32.4 |

(*DSEC = disodium ethylene bis(dithiocarbamate))

Recipes A and B result in good termination of reaction, recipe C does not (increased viscosity and solids content, i.e. conversion).

EXAMPLE 3

A styrene/butadiene polymer containing 23.5% by weight styrene and 76.5% by weight 1,3-butadiene based on the total weight of the polymer and 27.5% by weight extender oil (based on copolymer weight) is prepared by a continuous polymerization at 5° C. using the emulsifier, initiator system and modifier as specified in Example 1.

After a conversion of 60% the polymerization is shortstopped according to the present invention and according to prior art and the unconverted butadiene and styrene monomers are removed at 25° C. and 70° C. respectively; finally the rubber was recovered from the latex after mixing with extender oil.

The Mooney viscosity and nitrosamine content of the product are summarized in Table 3.

TABLE 3

| recipe | latex MV at shortstop dosing | latex MV after removal of monomers | MV end product | end product nitrosamine content DMNA |
|---|---|---|---|---|
| 0.16 phm SSD 0.015 phm Na₂S₄ 0.04 phm NaNO₃ | 125 | 120 | 50 | 700 μg/kg |
| 0.05 phm Na₂S₄ | 127 | 122 | 48 | <10 μg/kg |

Conclusion:
No differences in shortstopping efficiency occur, whereas the nitrosamine content is reduced to below 10 μg/kg.

EXAMPLE 4

In a rather similar way as described for Example 3 (except for the use of extender oil), a styrene/butadiene copolymer, containing 22.5% by weight styrene and 77.5% by weight butadiene, is produced, using a pure rosin acid soap emulsifier.

The polymerization reaction is shortstopped at a conversion degree of 64%, by using the two shortstopping recipes given in Table 4 for different parts of the same batch. The respective Mooney viscosities and nitrosamine contents of the obtained products have been indicated in Table 4.

TABLE 4

| recipe | latex MV at shortstop dosing | latex MV after removal of monomers | MV end product | DMNA content μg/kg |
|---|---|---|---|---|
| 0.24 phm SSD 0.015 phm Na₂S₄ 0.04 phm NaNO₂ | 55 | 53 | 51 | 8000 |
| 0.05 phm Na₂S₄ | 54 | 51 | 51 | <10 |

Conclusion:
No differences in shortstopping efficiency occur; the DMNA content is largely reduced.

EXAMPLE 5

In a rather similar way as described in Example 3, a styrene/butadiene copolymer, containing 31% by weight styrene and 69% by weight of butadiene, based on the weight of the copolymer and 27.5% extender oil based on copolymer weight, is produced.

The polymerization reaction is shortstopped at a conversion degree of 60%, by using two different shortstopping agents for different parts of the same batch.

The respective Mooney viscosities and nitrosamine contents of the obtained products have been listed in Table 5:

TABLE 5

| recipe | latex MV at shortstop dosing | latex MV after removal of monomers | MV end product | DMNA content μg/kg |
|---|---|---|---|---|
| 0.16 phm SSD 0.015 phm Na₂S₄ 0.04 phm NaNO₂ | 140 | 137 | 51 | 425 |
| 0.05 phm Na₂S₄ | 136 | 136 | 52 | <10 |

Conclusion:
No differences in shortstopping efficiency of the two recipes can be noticed whereas the DMNA content is largely reduced.

EXAMPLE 6

In a rather similar way as described in Example 3 a styrene/butadiene copolymer, containing 23% by weight styrene and 77% by weight of butadiene, is prepared.

After a conversion degree of 64%, the copolymerization is shortstopped by using several agents known from prior art and one according to the present invention, and the latex (still containing the non-converted monomers), was stored at 25° C. for several days. The respective Mooney viscosities at the beginning and after 48 hours are listed in the subsequent Table 6:

TABLE 6

| recipe | | MV 0 hrs | MV 48 hrs |
|---|---|---|---|
| A | SSD 0.09 phm | 47 | 50 |
| | $Na_2S_4$ 0.015 phm | | |
| | $NaNO_2$ 0.04 phm | | |
| B | SSD 0.20 phm | 47 | 51 |
| C | $Na_2S_4$ 0.015 phm | 47 | 49 |
| D | $Na_2S_2O_4$ 0.20 phm | 47 | 88 |
| E | $Na_2S_2O_4$ 0.10 phm | 47 | 95 |
| | $NaHSO_3$ 0.10 phm | | |

From these data it may be concluded that the recipes A, B and C are equally efficient and that recipes D and E do not show adequate shortstopping of the reaction.

While this invention has been described in detail for the purpose of illustration, it is not to be construed as limited thereby but is intended to cover all changes and modifications within the spirit and scope thereof.

That which is claimed is:

1. A process for shortstopping a free radical polymerization of a conjugated diene comprising:
    conducting the polymerization in an aqueous emulsion at a temperature of from about −20° C. to about 70° C.;
    using hydroperoxide as an initiator, and a redox activator system comprising a divalent transition metal, and a reducing agent; and
    in the presence of a sole shortstopping agent essentially consisting of an alkali metal polysulphide in an amount of from at least 0.07 parts by weight per hundred parts by weight of the total monomer initially charged to the polymerization system.

2. A process as in claim 1 wherein the conjugated diene monomer is polymerized with a vinyl-substituted aromatic monomer.

3. A process as in claim 2 conducted in the presence of a modifying agent and wherein the redox activator system futher comprises a chelating agent.

4. A process as in claim I, wherein the shortstopping agent is used in an amount of from 0.02 to 0.5 parts by weight per hundred parts by weight of the total monomer.

5. A process as in claim 1 wherein the conjugated diene is butadiene −1,3.

6. A process as in claim 2 wherein the conjugated diene is butadiene −1, 3, and the vinyl-substituted aromatic monomer is styrene.

7. A process as in claim 1, wherein the shortstopping agent is a compound of the formula $Me_2S_x$, where x has a value in the range of from 1.5 to 6.0, and Me is an alkali metal.

8. A process as in claim 7, wherein x has a value in the range of from 2.5 to 4.5.

9. A process as in claim 7 wherein S is a sodium salt.

10. A process as in claim 1 wherein a ferrocompound is used in the activator system.

11. A process as in claim 10 wherein said ferrocompound is ferro-sulphate.

12. A process as in claim 1 wherein the reducing agent of the activator system a compound is selected from the group consisting of sodium formaldehyde sulphoxylate, sodium sulphite, sodium benzaldehyde sulphoxylate and reducing sugars.

13. A process as in claim 12 wherein said reducing agent is sodium formaldehyde sulphoxylate.

14. A process as in claim 3 wherein the chelating agent is selected from the group consisting of sodium ethylenediamine tetraacetate (EDTA) sodium silicate, sodium pyrophosphate and sodium polyphosphate.

15. A process as in claim 14 wherein said chelating agent is sodium ethylenediamine tetraucetate (EDTA).

16. A process as in claim 3 wherein the activator system comprises:
    from 0.001 to 0.04 parts by weight ferrosulphate;
    from 0.01 to 0.2 parts by weight of a sulphoxylate; and
    from 0.005 to 0.2 parts by weight of a chelating agent, per 100 parts by weight of initially charged monomers.

17. A process as in claim 1 wherein the polymerization initiator is selected from the group consisting of paramenthane hydroperoxide, diisopropyl toluene hydroperoxide, cumene hydroperoxide, pinane hydroperoxide, diisopropylbenzene hydroperoxide, p-tert.butyl cumene hydroperoxide, hydrogen peroxide, 1,1-diphenylethane hydroperoxide or mixtures thereof.

18. A process as in claim 17 wherein the initiator is paramenthane hydroperoxide.

19. A process as in claim 17 wherein the initiator is present in an amount of from 0.01 to 0.4 parts by weight per 100 parts by weight of monomers.

20. A process as in claim 3 wherein said modifying agent is selected from the group consisting of tert.dodecyl mercaptan, n-dodecyl mercaptan, tert.hexadecylmercaptan, xanthogendisulphides, thioethers and thiophosphates.

21. A process as in claim 20 wherein the modifying agent is tert.dodecyl mercaptan.

22. A polymeric product substantially free from carcinogenic nitrosamines produced by the process of claim 1.

23. A polymeric product substantially free from carcinogenic nitrosamines produced by the process of claim 3.

* * * * *